ced Dec. 2, 1958

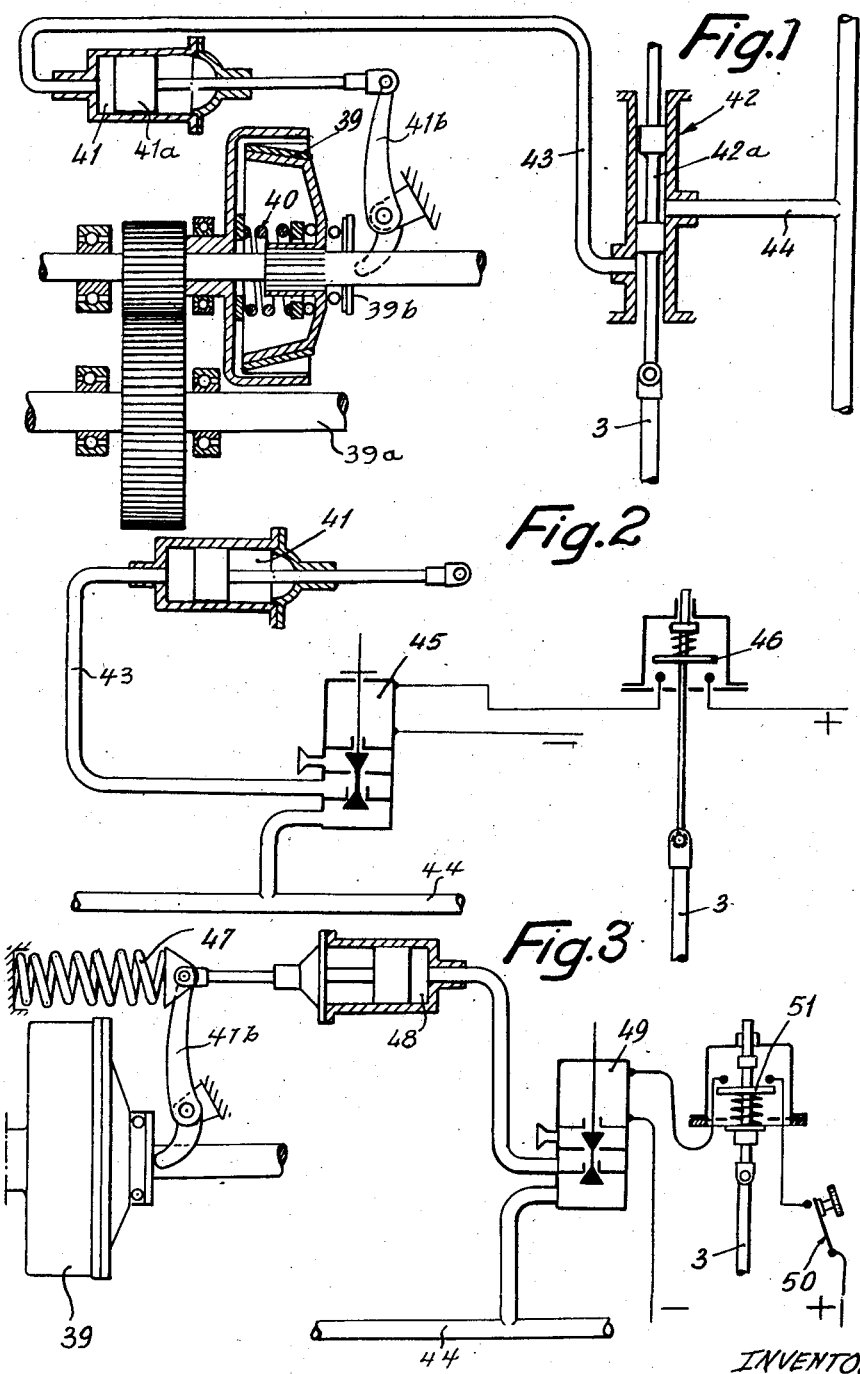

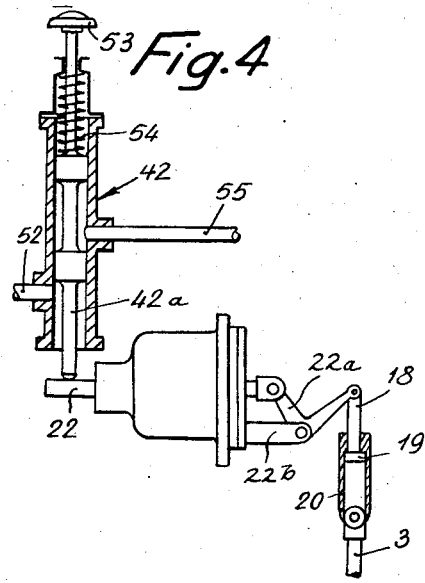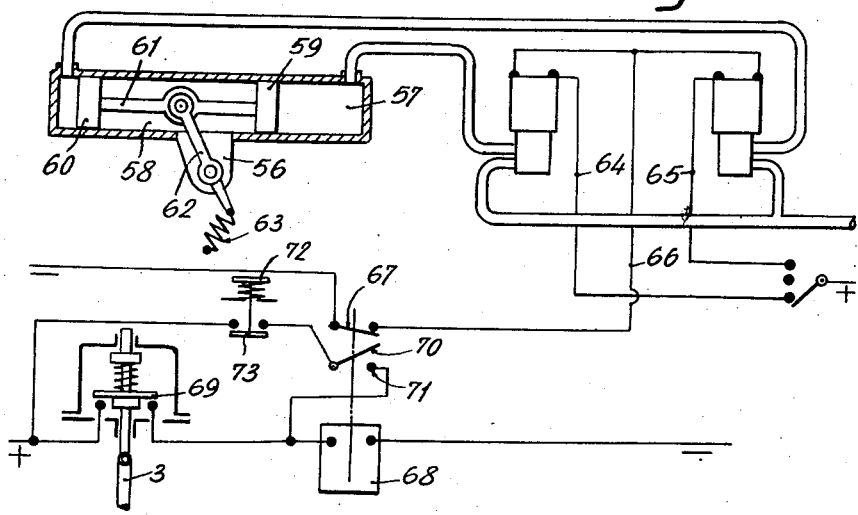

2,862,397
MECHANISM FOR AUTOMATICALLY LIMITING THE SPEED OF TURBINES DRIVING VEHICLES BY PLACING THE TRANSMISSION IN A NEUTRAL POSITION

Leon Saives, Billancourt, France, assignor to Regie Nationale des Usines Renault, Billancourt, France Application May 27, 1952, Serial No. 290,368
Claims priority, application France June 20, 1951
8 Claims. (Cl. 74—336.5)

This invention relates to vehicle turbines and more particularly to an apparatus for uncoupling the turbine from the vehicle driving means to preclude excessive turbine speeds when it is being in turn driven by the vehicle. This invention has for its principal object to avoid the danger of damaging turbines used for driving rail or road vehicles, when the vehicle, acquiring an excessive speed, for example, on a steep incline, in its turn rotates the turbine and causes it to reach an inadmissible speed of rotation.

In accordance with the invention, in order to eliminate this danger, there is associated with the turbine a mechanism which positively causes the transmission to be placed at neutral, so that it is then disengaged from the turbine and renders the latter independent of the speed of the vehicle.

A movable member comprising a rod, which may carry out a sliding movement, is operatively connected with the turbine in such manner as to be rendered operative when the speed of the turbine becomes dangerous. The displacement of this rod in turn actuates a mechanism which causes the transmission to be placed in neutral.

The accompanying drawings show several examples of embodiments of the invention without being in any way limitative.

Figures 1, 2 and 3 are schematic diagrams showing constructions which are based on the control of a clutch in such manner that the transmission automatically returns to its normal function when the turbine has decelerated to a speed lower than that at which it interrupted the operation of the transmission.

Figures 4 and 5 are schematic diagrams also including the use of a clutch, but the resetting in operation of the transmission is not automatic: but requires the intervention of the operator.

Figure 6:
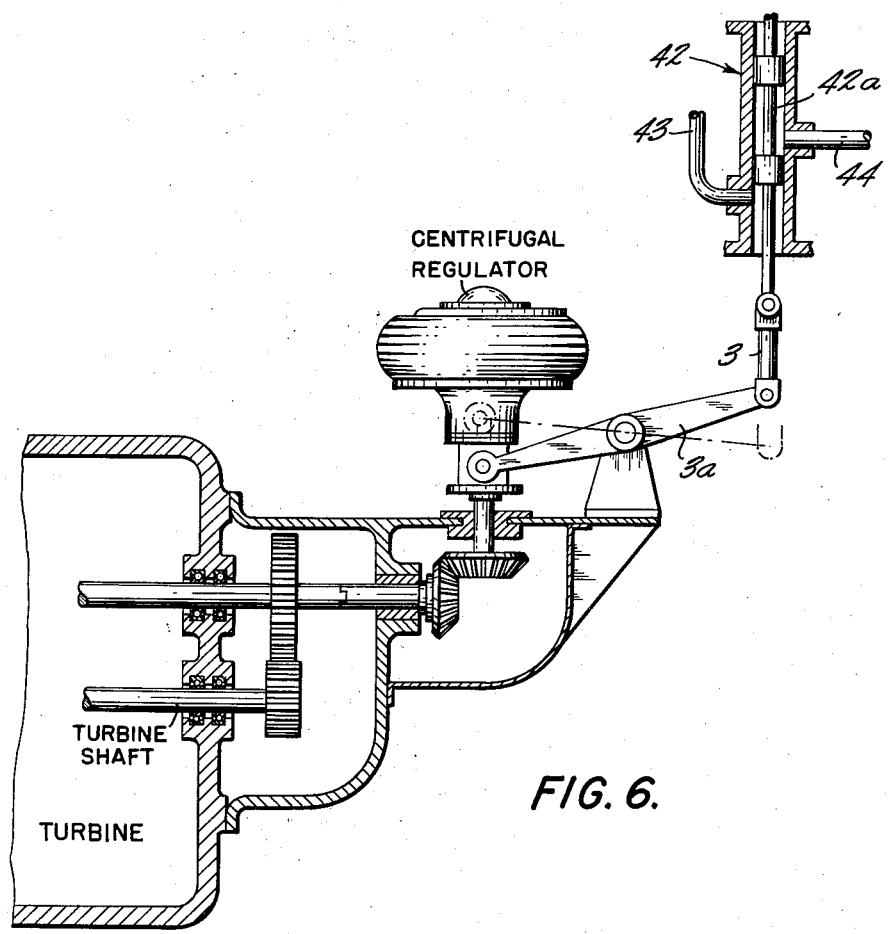

Figure 6 is a longitudinal view partly in section of the mechanism connected to a vehicle turbine. In Figures 1, 2 and 3, wherein similar parts have the same reference numeral, a rod 3 is set in operation by the means described in my patent application Serial No. 290,367, now Patent No. 2,755,351, filed on the same date as this application, for a safety system depending on placing in operation a warning signal and entitled "Improvements in or Relating to Turbine-Driven Vehicles for Avoiding Racing of Turbines."

The control of the rod 3 by a centrifugal mass or regularity (Figure 1 of the aforementioned patent application bearing the same date as this application) or the control of said rod by the balancing mechanism shown in Figure 2 of the same application and herein shown as a regulator Fig. 6.

Figure 1 shows a clutch 39 gear-coupled to drive shaft 39a as shown, the engagement of which is effected by a spring 40 and the disengagement of which is effected by a compressed air cylinder 41 and a distributor valve 42 which is controlled by the rod 3 functioning in a manner later herein described, the same manner as the rods 3 of Figures 1 and 2 of the aforementioned patent, Serial No. 290,367, now Patent No. 2,755,351. As the rod 3 is moved downwardly when the centrifugal regulator moves the lever 3a upwardly (Fig. 6) as the turbine exceeds a selected speed a distributor valve spool 42a is moved downwardly and the distributor 42 places a pipe 43, leading to control cylinder 41 in communication with a compressed air pipe 44 so that piston 41a is moved to the right rocking pivotally mounted lever 41b to press against plate 39b to overcome spring 40 and disengage the clutch 39. When the danger of excessive turbine speed has passed, and the turbine decelerates the rod 3 rises again and the pipe 43 is again placed in communication with the atmosphere as shown so that cylinder piston is returned to the position shown.

Figure 2 shows a modification of the mechanism according to Figure 1, in which the mechanical distributor 42 of Figure 1 is replaced by an electromagnetic valve 45 energised by a switch 46 controlled by the rod 3 serving the same purpose as in Figure 1. In the event of danger, the energisation of the electromagnetic valve 45 allows compressed air from the pipe 44 to pass to the cylinder 41 controlling the de-clutching. When the danger is past, the valves reassume the position shown in Figure 2 and the cylinder 41 exhausts to atmosphere.

Figure 3 shows a modification of the mechanism according to Figure 2, in which the clutch 39 is normally de-clutched by a spring 47. The clutch engagement is effected by air pressure in a cylinder 48. This pressure is given by an electromagnetic valve 49 energised by a control switch 50 available to the operator.

In the event of danger, the rod 3 is pulled downwardly and cuts off the current energising the electromagnetic valve by means of a switch 51.

In Figure 4, parts 18, 19, 3, 20, 22, identical with those having the same reference numerals in Figure 3 of the aforesaid patent application Serial No. 290,367, now Patent No. 2,755,351, referred to above, renders it possible, in the event of danger, for the rod 42 of a distributor similar to that in Figure 1, to feed compressed air to a pipe 52 which controls a de-clutching cylinder as in Figure 1.

When the danger is past, the rod 3 rises again, but the rod 22 is blocked by the distributor 42 and, in order to engage the transmission again, the operator must pull a handle 53 of the distributor upwardly in order to allow the rod 22 to move back towards the left and connect the de-clutching cylinder to atmosphere.

Figure 5 shows the application of the safety system to the change-speed gear control. This control is effected by a servo-motor 56 comprising two cylinders 57 and 58, the pistons 59 and 60 of which control, by means of a rod 61, a lever 62 which acts in any suitable manner on the movable member (selector lever, dog-clutch) of the change-speed gear. When neither of the cylinders 57 and 58 is under pressure, the lever 62 is brought to the neutral position by a spring 63 or any other known device. The two electromagnetic valves receive current through wires 64 and 65 which may be connected to a source of current by a switch. A common return wire 66 passes through the blade 67 of a relay 68 which is energised by a switch 69 actuated by the rod 3 having the same functions as that bearing the same references in Figures 1 and 2 of the aforementioned patent application Serial No. 290,367 now Patent No. 2,755,351.

When there is danger, the rod 3 closes the switch 69 and the energised relay 68 attracts the blade 67, thus interrupting the current to the electromagnetic valves, thus causing the change speed gear to be placed in neutral. At the same time, a blade 70 attracted by the relay coil closes the switch 71, permitting current to pass through the relay, thus forming a holding switch.

The mechanism thus remains in the neutral position even after the engine has slowed down. In order to allow the change-speed gear to operate again, it is necessary to interrupt the relay current by pressing on a button 72 of a switch 73.

However, it is possible to envisage other mechanical or electrical means for ensuring that the transmission is placed in neutral, starting from a rod displaced by a member connected with the turbine and becoming operative when the turbine has reached a dangerous speed.

The mechanism which has just been described may also be combined with one and/or the other of those mechanisms which are described in the two patent applications Serial Nos. 290,367, now Patent No. 2,755,351, and 290,369, filed on the same day by the applicant for:

(1) Improvements in or Relating to Turbine-Driven Vehicles for Preventing Racing of the Turbines, and (2) Mechanism for Automatically Limiting the Speed of Turbines Driving Vehicles, by Operation of the Brakes Respectively.

I claim:

1. In a vehicle drive, vehicle-driving means, a turbine adapted to drive the vehicle, power transmission means including a clutch coupling said turbine with said vehicle-driving means, spring means normally holding said clutch in disengaged position, fluid pressure operated means for holding said clutch in engaged position against the action of said spring means, means including a valve for supplying fluid under pressure to said clutch-engaging means, actuating means connected to and driven by the turbine, said actuating means being responsive to turbine speed and including a movable actuating member, and means operatively connecting said actuating member with said valve to actuate said valve to relieve the fluid pressure of said clutch-engaging means and thereby disconnect the turbine from the vehicle-driving means when the speed of the turbine exceeds a predetermined value.

2. In a vehicle drive, vehicle-driving means, a turbine adapted to drive the vehicle, power transmission means including a clutch coupling said turbine with said vehicle-driving means, power means for operating said clutch, actuating means connected to and driven by said turbine, said actuating means being responsive to turbine speed and including a movable actuating member, means connecting said actuating member with said clutch-operating means to actuate said operating means to disengage the clutch and thereby disconnect the turbine from said vehicle-driving means when the speed of the turbine exceeds a predetermined value, locking means for maintaining said clutch disengaged even when the turbine speed thereafter drops below said value and manual resetting means for releasing said locking means to permit reengagement of said clutch.

3. In a vehicle drive, vehicle-driving means, a turbine adapted to drive the vehicle, power transmission means comprising change-speed gearing having driving positions and a neutral, non-driving position, spring means for shifting said transmission to neutral position, power means for shifting said transmission to driving position, actuating means connected to and driven by said turbine, said actuating means being responsive to turbine speed and including a movable actuating member, and means connecting said actuating member to said shifting means to deenergize said shifting means when the speed of the turbine exceeds a predetermined value, whereby said transmission is shifted to neutral position by said spring means and said turbine is thereby disconnected from said vehicle-driving means.

4. In a vehicle, drive, vehicle-driving means, a turbine adapted to drive the vehicle, power transmission means comprising change-speed gearing having driving positions and a neutral, non-driving, position, spring means for shifting said transmission to neutral position, power means for shifting said transmission to driving position, actuating means connected to and driven by said turbine, said actuating means being responsive to turbine speed and including a movable actuating member, means connecting said actuating member to said shifting means to deenergize said shifting means when the speed of the turbine exceeds a predetermined value, whereby said transmission is shifted to neutral position by said spring means and said turbine is thereby disconnected from said vehicle-driving means, locking means for maintaining said transmission in neutral position even when the turbine speed thereafter drops below said value and manual resetting means for releasing said locking means to permit the shifting of said transmission to driving position by said shifting means.

5. In a vehicle drive, vehicle-driving means, a turbine adapted to drive the vehicle, power transmission means coupling said turbine with said vehicle-driving means including means for uncoupling said turbine from said vehicle-driving means, actuating means including an actuating member and means responsive to turbine speed for actuating said actuating member as a function of selected turbine speeds, and means including power-actuating means connecting said actuating member with said uncoupling means to uncouple said turbine from said driving means when the speed of the turbine exceeds a selected value.

6. In a vehicle drive, vehicle-driving means, a turbine adapted to drive the vehicle, power transmission means including a clutch coupling said turbine with said vehicle-driving means, actuating means including means responsive to turbine speed connected to and driven by said turbine, said actuating means including a movable actuating member, and means including power-actuating means connecting said actuating member with said clutch to disengage the clutch and thereby disconnect the turbine from said vehicle-driving means when the speed of the turbine exceeds a predetermined value.

7. In a vehicle drive, vehicle-driving means, a turbine adapted to drive the vehicle, power transmission means including a clutch coupling said turbine with said vehicle-driving means, spring means normally holding said clutch in engaged position, fluid pressure operated means for disengaging said clutch, means including a valve for supplying fluid under pressure to said clutch-disengaging means, actuating means comprising means responsive to turbine speed connected to and driven by said turbine and including a movable actuating member operable by said speed responsive means, and means operatively connecting said actuating member with said value to actuate said valve to supply pressure fluid to said clutch-disengaging means and thereby disengage said clutch when the speed of the turbine exceeds a selected value.

8. In a vehicle drive, vehicle-driving means, a turbine adapted to drive the vehicle, power transmission means including a clutch coupling said turbine with said vehicle-driving means, spring means normally holding said clutch in engaged position, fluid pressure operated means for disengaging said clutch, means including an electromagnetic valve for supplying fluid under pressure to said clutch-disengaging means, means including a switch for supplying electric current to operate said valve, actuating means comprising means responsive to turbine speed connected to and driven by said turbine, said actuating means including a movable actuating member connected to said switch so as to actuate said switch to operate said valve and thereby supply pressure fluid to said clutch-disengaging means to disengage said clutch when the speed of the turbine exceeds a predetermined value.

References Cited in the file of this patent

UNITED STATES PATENTS

| | | |
|---|---|---|
| 2,233,720 | Velo | Mar. 4, 1941 |
| 2,242,374 | Schultz | May 20, 1941 |
| 2,286,585 | Simpson | June 16, 1942 |
| 2,392,520 | Benz | Jan. 8, 1946 |
| 2,440,558 | Price | Apr. 27, 1948 |
| 2,499,128 | Brunken | Feb. 28, 1950 |
| 2,519,394 | Orner | Aug. 22, 1950 |
| 2,602,428 | Randol | July 8, 1952 |
| 2,609,900 | Neracher | Sept. 9, 1952 |